(12) United States Patent
Ozaki et al.

(10) Patent No.: US 10,170,915 B2
(45) Date of Patent: Jan. 1, 2019

(54) ENERGY MANAGEMENT SYSTEM, ENERGY MANAGEMENT METHOD AND COMPUTER PROGRAM

(71) Applicant: SUMITOMO ELECTRIC INDUSTRIES, LTD., Osaka-shi, Osaka (JP)

(72) Inventors: Tomoya Ozaki, Osaka (JP); Yoshihisa Ishigaki, Osaka (JP); Junji Itoh, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 203 days.

(21) Appl. No.: 15/114,911

(22) PCT Filed: Feb. 25, 2015

(86) PCT No.: PCT/JP2015/055364
§ 371 (c)(1),
(2) Date: Jul. 28, 2016

(87) PCT Pub. No.: WO2015/129734
PCT Pub. Date: Sep. 3, 2015

(65) Prior Publication Data
US 2016/0344189 A1    Nov. 24, 2016

(30) Foreign Application Priority Data
Feb. 25, 2014 (JP) .................. 2014-034401

(51) Int. Cl.
H02J 1/00    (2006.01)
H02J 3/00    (2006.01)
(Continued)

(52) U.S. Cl.
CPC ............. H02J 3/381 (2013.01); H02J 3/32 (2013.01); H02J 7/007 (2013.01); H02J 7/0047 (2013.01);
(Continued)

(58) Field of Classification Search
CPC   G06Q 50/06; H02J 3/381; H02J 7/007; H02J 7/35; H02J 3/32; H02J 7/0047;
(Continued)

(56) References Cited

U.S. PATENT DOCUMENTS 9,559,521 B1 * 1/2017 King .................... H02J 7/34
9,568,901 B2 * 2/2017 Hooshmand ........... G05B 15/02
(Continued)

FOREIGN PATENT DOCUMENTS

JP    2013-013240 A    1/2013
WO   WO-2014/010442 A1   1/2014

OTHER PUBLICATIONS

Kento Tamura, et al., "Storage Battery Design and Charge-Discharge Management for the Energy on Demand System," IEICE Technical Report, Jul. 2012, vol. 112, No. 133, pp. 37-42, USN2012-24.

*Primary Examiner* — Alfonso Perez Borroto
*Assistant Examiner* — Esayas Yeshaw
(74) *Attorney, Agent, or Firm* — Drinker Biddle & Reath LLP

(57) ABSTRACT

One aspect of the present invention relates to a computer program for causing a computer to operate as an energy management system for managing the operation state of electric power devices including a storage battery connected to a power grid. The program includes: a first step of acquiring static parameters used in controlling the electric power devices; and a second step of controlling the electric power devices based on the acquired static parameters. The (Continued)

static parameters acquired in the first step include at least five types of parameters, namely, a storage battery capacity, dischargeable power, chargeable power, discharge efficiency, and charge efficiency.

13 Claims, 17 Drawing Sheets

(51) Int. Cl.
    *H02J 3/38*     (2006.01)
    *H02J 3/32*     (2006.01)
    *H02J 7/00*     (2006.01)
    *H02J 7/35*     (2006.01)
    *G06Q 50/06*     (2012.01)

(52) U.S. Cl.
    CPC ................ *H02J 7/35* (2013.01); *G06Q 50/06* (2013.01); *H02J 2007/005* (2013.01); *Y02E 40/76* (2013.01); *Y04S 10/54* (2013.01); *Y04S 10/545* (2013.01)

(58) Field of Classification Search
    CPC .. H02J 2007/005; Y04S 10/54; Y04S 10/545; Y02E 40/76
    See application file for complete search history.

(56) References Cited

U.S. PATENT DOCUMENTS

| | | | |
|---|---|---|---|
| 9,727,071 B2* | 8/2017 | Steven | G05F 1/66 |
| 2012/0065792 A1* | 3/2012 | Yonezawa | H02J 3/14 |
| | | | 700/291 |
| 2012/0296482 A1* | 11/2012 | Steven | G06Q 50/06 |
| | | | 700/291 |
| 2013/0346762 A1* | 12/2013 | Hodges | H01M 10/4257 |
| | | | 713/300 |
| 2014/0039709 A1* | 2/2014 | Steven | G06Q 10/06 |
| | | | 700/291 |
| 2014/0039710 A1* | 2/2014 | Carter | G06Q 10/06 |
| | | | 700/291 |
| 2014/0042978 A1* | 2/2014 | Nishibayashi | H02J 7/007 |
| | | | 320/134 |
| 2014/0049109 A1* | 2/2014 | Kearns | H02J 3/00 |
| | | | 307/52 |
| 2015/0022140 A1* | 1/2015 | Heishi | H02J 7/34 |
| | | | 320/101 |
| 2015/0088576 A1* | 3/2015 | Steven | G06Q 50/06 |
| | | | 705/7.22 |
| 2015/0214768 A1 | 7/2015 | Matsuyama et al. | |
| 2016/0020613 A1* | 1/2016 | Kimura | H02J 3/32 |
| | | | 307/52 |

* cited by examiner sEMSA (sumitomo EMS architecture)

FIG. 2
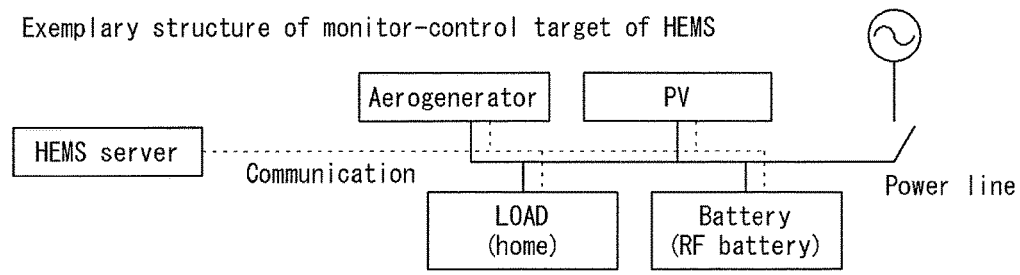
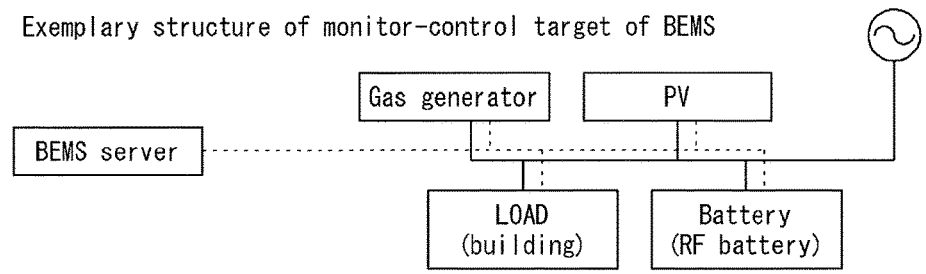
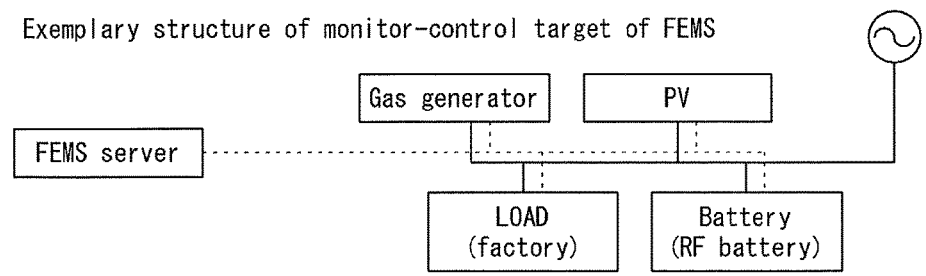
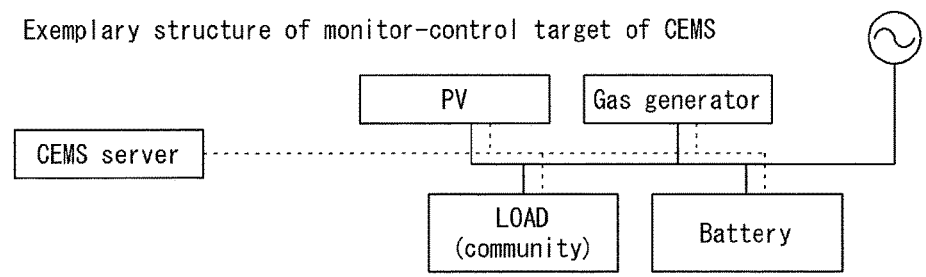

FIG. 3

Correspondence between sEMSA and Examples 1 and 2

| Correspondence relative to sEMSA | | Example 1 | Example 2 |
|---|---|---|---|
| Business layer | | island-oriented power | Energy conservation consulting<br>Electricity market trading<br>$CO_2$ emission rights |
| Service layer | | BCP response<br>Demand-supply balance adjustment | Power cost minimization<br>BCP response<br>Demand-supply balance adjustment<br>$CO_2$ emission reduction |
| Equipment layer | Power storage | RF battery (10kWh) | Lithium-ion battery (100kWh) |
| | Power generation | SiPV (4kW)<br>CPV (1kW)<br>CIGSPV (2kW)<br>Aerogenerator (1.5kW) | SiPV (500kW)<br>GE (650kW) |
| | Load | Home (~750W) | Factory (~2MW) |
| | System | Remote island (self-contained) | Developed country (interconnected system) |

FIG. 5

Equipment structure of Example 1 (HEMS)

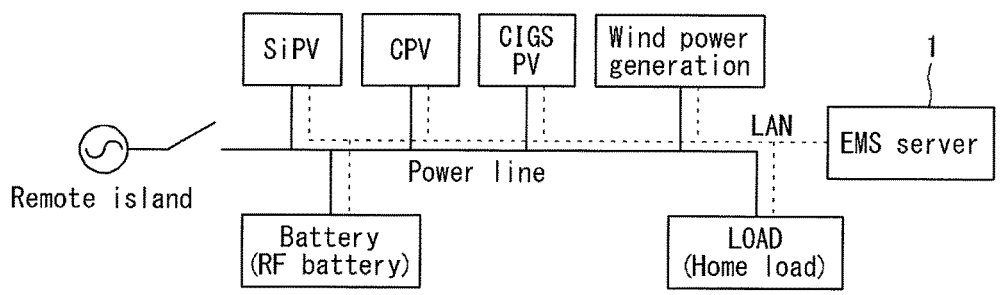

Business layer: Remote island-oriented power

Service layer: BCP response, demand-supply balance adjustment

Operation layer: Power visualization, power generation estimation, mathematical programming, instrumentation control Model layer: Circulation type, renewable energy, home, remote island Equipment layer: RF battery, photovoltaic power generation, wind power generation, home, remote island Develop EMS that satisfies development requirements, based on sEMSA System structure of Example 1 (HEMS)

FIG. 7

Setting values of parameters used in model layer of Example 1

| Circulation type storage battery model (RF battery) | |
|---|---|
| Storage battery capacity | 10kWh |
| Dischargeable power limit value | 4kW |
| Chargeable power limit value | 4kW |
| Discharge efficiency | 90% |
| Charge efficiency | 90% |

| Home load model | |
|---|---|
| Home electronic appliance 1 (rated power consumption) | 150W |
| Home electronic appliance 2 (rated power consumption) | 100W |
| Home electronic appliance 3 (rated power consumption) | 10W |
| Home electronic appliance 4 (rated power consumption) | 180W |
| Home electronic appliance 5 (rated power consumption) | 250W |
| Home electronic appliance 6 (rated power consumption) | 60W |

| Renewable energy model | |
|---|---|
| Photovoltaic power generation model | |
| SiPV | |
| Rated output | 4kW |
| CPV | |
| Rated output | 1kW |
| CIGSPV | |
| Rated output | 2kW |
| Wind power generation model | |
| Rated output | 1.5kW |

| Remote island system model |
|---|
| In every time slot |
| power generation amount − power consumption amount + power discharge amount − power charge amount ≒ 0 |

FIG. 13

System structure of Example 2 (equipment layer)

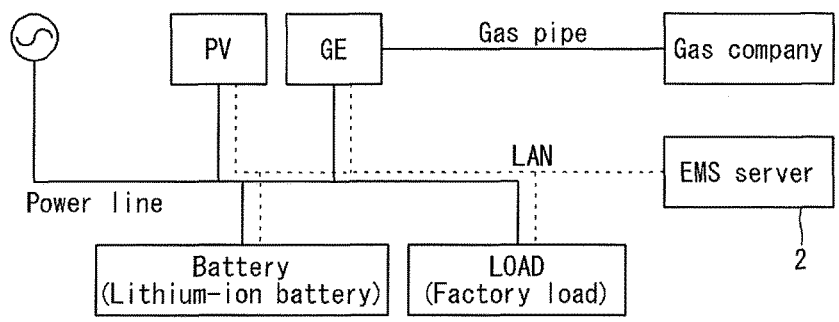

Business layer: Energy conservation consulting,
 electricity market trading, $CO_2$ emission rights Service layer: Power cost minimization, BCP response,
 demand-supply balance adjustment, $CO_2$ emission reduction Operation layer: Power visualization, power generation estimation,
 demand estimation, mathematical programming,
 instrumentation control Model layer: Non-circulation type, fuel generator, renewable energy,
 factory, large-scale system Equipment layer: Lithium-ion battery, CGS, photovoltaic power generation,
 factory, developed country Develop EMS that satisfies development requirements, based on sEMSA

FIG. 15

Setting values of parameters used in model layer of Example 2

| Non-circulation type storage battery model (lithium-ion battery) | |
|---|---|
| Storage battery capacity | 100kWh |
| Dischargeable power limit value | 250kW |
| Chargeable power limit value | 250kW |
| Discharge efficiency | 95% |
| Charge efficiency | 95% |

| Fuel generator model GE | |
|---|---|
| Rated output | 650kW |
| Fuel consumption | 150m³/h |
| Output lower limit value | 325kW |

| Renewable energy model PV | |
|---|---|
| Rated output | 50kW |

| Factory model | |
|---|---|
| Power demand | P[kW] |

| Large-scale system model | |
|---|---|
| Contracted power | X[kW] |
| Contract electricity charge | Y[yen] |
| Usage-based charge | Z[yen/kWh] |

FIG. 17

Comparison of development contents between Example 1 and Example 2 based on sEMSA

| Correspondence with sEMSA | | Example 1 | Example 2 |
|---|---|---|---|
| Model layer | Circulation type storage battery | Newly developed | – |
| | Non-circulation type storage battery | – | Newly developed |
| | Fuel generator | – | Newly developed |
| | Renewable energy | Newly developed | Already developed with Example 1 |
| | Factory load | – | Newly developed |
| | Home load | Newly developed | – |
| | Large-scale system | – | Newly developed |
| | Remote island | Newly developed | – |
| Operation layer | Power visualization | Newly developed | Already developed with Example 1 |
| | Power generation estimation | Newly developed | Already developed with Example 1 |
| | Demand estimation | – | Newly developed |
| | Mathematical programming | Newly developed | Already developed with Example 1 |
| | Instrumentation control | Newly developed | Already developed with Example 1 |

ENERGY MANAGEMENT SYSTEM, ENERGY MANAGEMENT METHOD AND COMPUTER PROGRAM

TECHNICAL FIELD

The present invention relates to an energy management system and an energy management method for managing an operation state of an electric power device including a storage battery connected to a power grid, and a computer program for causing a computer to operate as the system.

BACKGROUND ART

For the purpose of achieving stable power supply and energy conservation, there is a need for introducing electric power devices such as a photovoltaic power generation (PV) system, a storage battery, and a fuel cell in a large-scale facility such as a building or a factory, or an individual home.

While stable power supply and energy conservation can be promoted by causing such electric power devices to operate as planned, it takes users much time and labor to manage the operation schedule.

Accordingly, in recent years, an energy management system (EMS) that integrally manages the operation state of electric power devices connected to a power grid has been introduced (for example, see Patent Literature 1).

The EMS is a system that structures a communications network with the electric power devices being the management target. By the EMS monitoring and controlling the electric power devices through information communication via the network, the power use amount is visualized and energy conservation is promoted. For example, as shown in FIG. 2, the conventional EMSs can be broadly divided as follows based on the management target:

HEMS (Home Energy Management System);
BEMS (Building Energy Management System);
FEMS (Factory Energy Management System); and
CEMS (Community Energy Management System).

As represented by the prefix of each EMS, the HEMS is home-oriented; the BEMS is commercial building-oriented; the FEMS is factory-oriented; and the CEMS is oriented to the entire community including the foregoing facilities.

While the EMSs differ from each other in the management target, they are mostly identical in the basic control content, which is, monitoring and controlling power demand and power supply.

CITATION LIST

Patent Literature

Patent Literature 1: Japanese Unexamined Patent Publication No. 2013-13240

SUMMARY OF INVENTION

Technical Problem

However, normally, the EMSs are largely different from each other in the type and number of equipment depending on the management target. Therefore, an EMS that is developed for a specific management target cannot be used for other management target as it is.

For example, there is a variety of types of generators including a gas generator, a PV, an aerogenerator and the like. Further, there is a variety of types of storage batteries including a redox flow (RF) battery, a lithium-ion battery, a molten salt battery, a lead-acid battery and the like. Still further, there is a variety of types of loads including a factory, an office, a home, a commercial facility and the like. Still further, there is a variety of types of systems including a large-scale system (power variation tolerance), a small-scale system, an independent system and the like.

Further, even as to an identical equipment type, the characteristic of the equipment differs depending on the manufacturer or the product. Also, the service that the customers require of an EMS diversifies. Accordingly, normally, an algorithm meeting the purpose of each customer is individually developed as a system for each management target.

As described above, conventionally, when EMSs of different types are to be developed, it has been necessary to develop a system customized for each management target, and therefore software must be developed for each case. Thus, an enormous development cost has been disadvantageously incurred.

The present invention has been made in view of such a conventional problem, and an object thereof is to realize efficient development of EMSs.

Solution to Problem

The present invention relates to a computer program for causing a computer to operate as an energy management system for managing an operation state of an electric power device including a storage battery connected to a power grid.

The computer program of the present invention includes:
a first step of acquiring static parameters to be used in controlling the electric power device; and
a second step of controlling the electric power device based on the acquired static parameters, wherein
the static parameters acquired in the first step are at least five types of parameters including:
a storage battery capacity, being an energy capacity of the storage battery that can be delivered from a fully charged state;
dischargeable power, being a limit value of power that the storage battery can discharge;
chargeable power, being a limit value of power that the storage battery can be charged;
discharge efficiency, being a proportion of output power relative to stored power when the storage battery discharges; and
charge efficiency, being a proportion of stored power relative to input power when the storage battery is charged.

Advantageous Effects of Invention

According to the present invention, EMSs can be efficiently developed.

BRIEF DESCRIPTION OF DRAWINGS

FIG. 2 is an explanatory diagram showing exemplary structures of EMSs that can be developed as a system with an sEMSA.

FIG. 3 is a table showing the correspondence between the sEMSA and Examples 1 and 2 in terms of a business layer, a service layer, and an equipment layer.

FIG. 5 is an equipment structure diagram of Example 1 relating to a HEMS.

FIG. 7 is an explanatory diagram of setting values of static parameters that define the mathematical model of a model layer and a relational expression in Example 1 being the HEMS.

FIG. 13 is an equipment structure diagram of Example 2 relating to a FEMS.

FIG. 15 is an explanatory diagram of setting values of static parameters that define the mathematical model of a model layer and a relational expression in Example 2 being the FEMS.

FIG. 17 is a table showing a comparison of development contents between Example 1 and Example 2 based on the sEMSA.

DESCRIPTION OF EMBODIMENTS

Overview of Embodiment of Present Invention

Figure 1:
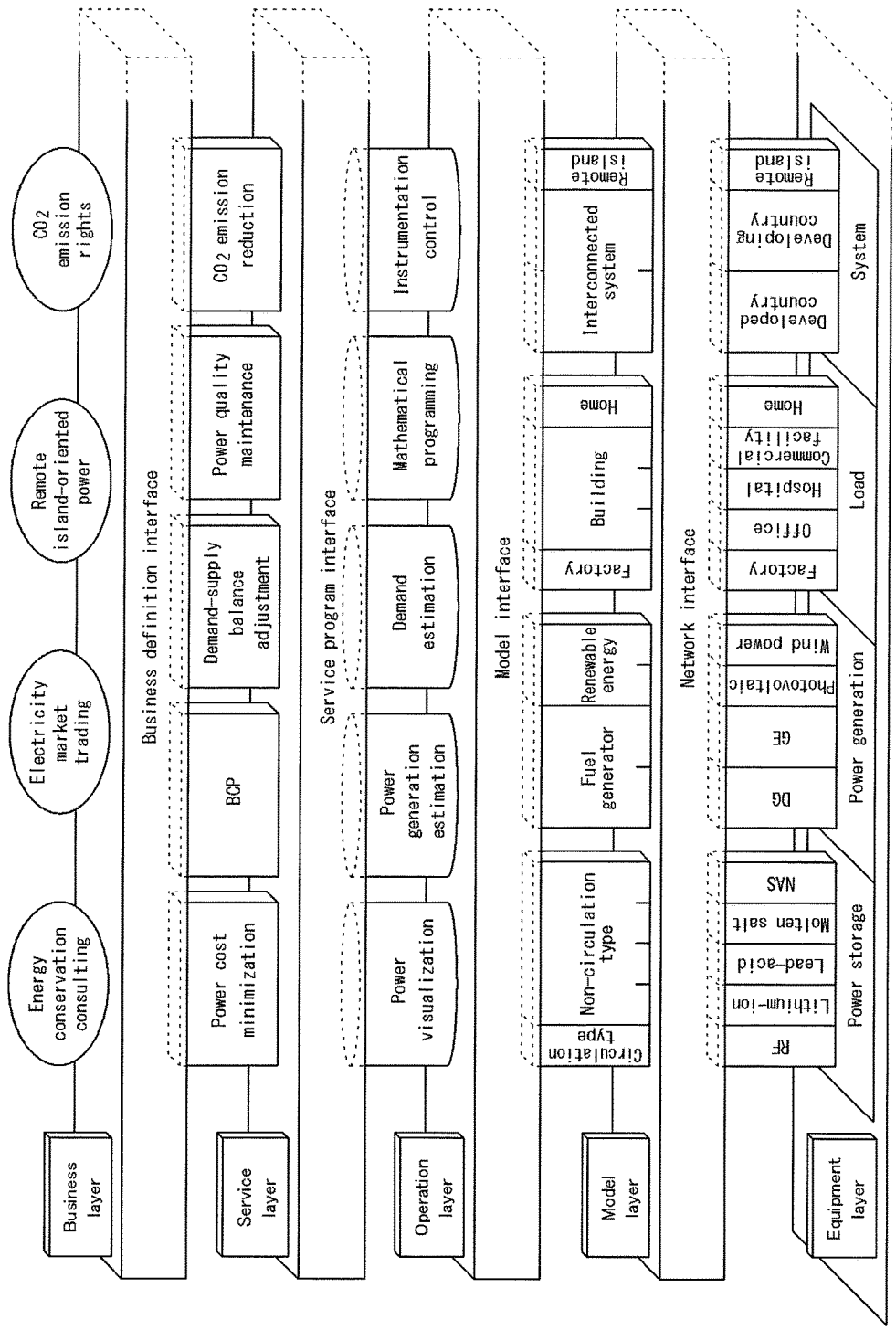
FIG. 1 is an explanatory diagram of an architecture (design concept) for developing an EMS according to an embodiment of the present invention.

In the following, the overview of an embodiment of the present invention will be listed.

(1) A computer program of the present embodiment is a computer program for causing a computer to operate as an energy management system for managing an operation state of an electric power device including a storage battery connected to a power grid, the computer program including:

a first step of acquiring static parameters to be used in controlling the electric power device; and a second step of controlling the electric power device based on the acquired static parameters, wherein the static parameters acquired in the first step are at least five types of parameters including:

a storage battery capacity, being an energy capacity of the storage battery that can be delivered from a fully charged state;

dischargeable power, being a limit value of power that the storage battery can discharge;

chargeable power, being a limit value of power that the storage battery can be charged;

discharge efficiency, being a proportion of output power relative to stored power when the storage battery discharges; and charge efficiency, being a proportion of stored power relative to input power when the storage battery is charged.

With the computer program of the present embodiment, out of the static parameters acquired in the first step, the static parameters relating to the storage battery is simplified down to at least five parameters, namely, a storage battery capacity, dischargeable power, chargeable power, discharge efficiency, and charge efficiency. Therefore, control that is applicable to a plurality of types of EMSs can be accurately exerted.

Accordingly, in developing a plurality of types of EMSs, any control program of other EMS having already been developed can be used. Thus, the EMSs can be efficiently developed.

(2) In the computer program according to the present embodiment, the static parameters acquired in the first step may further include a self discharge rate, which is a rate of a reduction in the storage capacity by self discharge after a lapse of prescribed time.

This is because, when the self discharge rate is included in the static parameters, various kinds of control can be exerted with a precise remaining charge amount which is almost the actual value.

(3) In the computer program according to the present embodiment, the static parameters relating to the storage battery acquired in the first step are preferably fixed to at least the five parameters noted in (1), or the six parameters noted in (1) and (2).

This is because, when the static parameters are fixed to at least the five or six parameters, control that is applicable to a plurality of types of EMSs can be more accurately exerted as compared to the case where four or five or less parameters out of the foregoing parameters are employed.

(4) In the computer program according to the present embodiment, preferably, the control exerted over the electric power device in the second step is control that uses at least one result out of five types of categorized control, the five types of control including:

power monitoring, being control to visualize a demand and supply state of power in the power grid;

power generation estimation, being control to estimate a power generation amount in the power grid;

demand estimation, being control to estimate a power consumption amount in the power grid;

demand and supply planning, being control to plan power demand and supply in the power grid; and instrumentation control, being control to cause the electric power device included in the power grid to operate in accordance with a sensing result.

The reason is as follows. The five types of control are the result of categorizing conventional various kinds of control that may be employed for various types of EMSs (for example, see FIG. 2). Here, employing the above-noted five or six parameters as the static parameters of the storage battery, the five types of control can be properly exerted over the electric power device including the storage battery.

(5) In the computer program according to the present embodiment, when the power grid is not connected to a power system (in the case of Example 1 described later), preferably, the electric power device is controlled such that a relational expression is satisfied in every time slot in the power grid, the relational expression being:

$$\text{power generation amount} - \text{power consumption amount} + \text{power discharge amount} - \text{power charge amount} \approx 0$$

This is because, when the relational expression is satisfied in every time slot, balance between demand and supply can be adjusted for the management-target power grid. For example, an EMS suitable for a "remote island" can be provided.

(6) In the computer program according to the present embodiment, when the electric power device includes a renewable energy generator, preferably, the static parameters acquired in the first step include at least a maximum power generation amount determined by a rated output of the renewable energy generator.

The reason is as follows. In the case of a renewable energy generator, the output is determined by the weather on a moment-by-moment basis. Accordingly, employing solely the maximum power generation amount at the time point as the static parameter is sufficient for various kinds of control to be exerted similarly to the case where other static parameters are also employed.

(7) In the computer program according to the present embodiment, when the electric power device includes a fossil-fuel generator, preferably, the static parameters acquired in the first step include at least a rated output, a fuel consumption amount, and an output lower limit value of the fossil-fuel generator.

This is because, in the case of the fossil-fuel generator, the range of possible output values is limited, and control can be exerted within that range. Accordingly, as compared to the case where solely the rated output is selected as the static parameter, various kinds of control can be properly exerted.

(8) In the computer program according to the present embodiment, when the electric power device includes a home load, preferably, the static parameters acquired in the first step include at least an individual rated power consumption of the home load.

This is because, with the home load, it is relatively easy to monitor and control an individual load. Accordingly, employing the rated power consumption as the static parameter, various kinds of control can be properly exerted.

(9) In the computer program according to the present embodiment, when the electric power device includes a factory load, preferably, the static parameters acquired in the first step include at least power demand of the entire factory.

The reason is as follows. Since the number of loads included in a factory is enormous and often varies in the future, it is difficult to exert various kinds of control employing power consumption of individual loads as the static parameter.

(10) In the computer program according to the present embodiment, when the power grid is connected to the power system, preferably, the static parameters relating to the power system acquired in the first step at least include contracted power, a contract electricity charge, and a usage-based charge.

This is because, employing not only the contracted power and the contract electricity charge but also the usage-based charge as the static parameters, various kinds of control can be more precisely exerted over the power grid connected to the system.

(11) An energy management method according to the present embodiment is a method for managing an operation state of an electric power device including a storage battery connected to a power grid. The method has a structure substantially identical to that of the computer program according to the present embodiment.

Accordingly, the energy management method according to the present embodiment provides the operation and effect similar to those provided by the computer program according to the present embodiment.

(12) An energy management system (EMS) according to the present embodiment is an EMS for managing an operation state of an electric power device including a storage battery connected to a power grid, the system including a computer apparatus in which the computer program according to the present embodiment is installed.

Accordingly, the energy management system according to the present embodiment provides the operation and effect similar to those provided by the computer program according to the present embodiment.

(13) An energy management system (EMS) according to the present embodiment in other aspect is an energy management system for managing an operation state of an electric power device connected to a power grid, the system including:

an acquiring unit that acquires a static parameter modeled in a first layer for controlling the electric power device; and a control unit that inputs the static parameter acquired by the acquiring unit into one or more control programs categorized in a second layer of a level higher than the first layer and executes the control program(s), to thereby control the operation state of the electric power device.

With the energy management system according to the present embodiment, the acquiring unit acquires the static parameter modeled in the first layer, and the control unit inputs the acquired static parameter into one or more control programs categorized in the second layer of a level higher than the first layer and executes the control program(s), to thereby control the operation state of the electric power device. Accordingly, when the static parameter is modeled properly in the first layer and the control programs are categorized properly in the second layer, a commonality of the static parameter and control programs can be achieved so as to be applicable to different types of EMSs.

Accordingly, in developing a plurality of types of EMSs, any static parameter and control program of other EMS having already been developed can be used. Thus, the EMSs can be efficiently developed.

Details of Embodiment of Present Invention

Hereinafter, a detailed description will be given of an embodiment of the present invention with reference to the drawings.

[Architecture for EMS Development]

FIG. 1 is an explanatory diagram of an architecture (design concept) for developing an EMS according to an embodiment of the present invention.

In conventional EMS development, practically, the business operators develop systems independently of each other. For example, a home electronic appliance manufacturer develops a HEMS, and a machinery and equipment vendor develops a FEMS. Accordingly, computer programs to be newly developed are inefficiently great in number.

Through experiences of developing different types of EMSs such as HEMSs and FEMSs, the inventor of the present invention has found that system development can be efficiently carried out based on an architecture in which functions are categorized in each of a plurality of layers, and devised the architecture shown in FIG. 1.

Hereinafter, with reference to FIG. 1, a detailed description will be given of the architecture devised by the inventor of the present invention. Note that, in the present embodiment, the architecture shown in FIG. 1 is also referred to as an "sEMSA" (an abbreviation of "sumitomo EMS Architecture").

Further, a plurality of functions included in each of the layers of the sEMSA are exemplary functions currently categorized. Accordingly, as represented by broken lines on the right side in FIG. 1, new functions may be added in each layer in the future.

As shown in FIG. 1, the sEMSA is created by abstracting, in stages, matters necessary for EMS development into five layers from a physically lower-level layer toward higher-level layers. The sEMSA includes an "equipment layer", a "model layer", an "operation layer", a "service layer", and a "business layer".

Further, the sEMSA includes a "network interface", a "model interface", a "service program interface", and a "business definition interface", which are four interfaces each interposed between the layers.

Out of the five layers, the "equipment layer" is a layer for categorizing the types of various electric power devices (hardware) monitored and controlled by EMSs.

Specifically, in the equipment layer of the sEMSA, the electric power devices necessary for EMSs are broadly classified into four types of functions, namely, a "power storage", a "power generation", a "load", and a "system".

The "power storage" includes a RF (redox flow) battery, a lithium-ion battery, a lead-acid battery, a molten salt battery, an NAS battery (registered trademark) and the like.

The "power generation" includes a DG (diesel generator), a GE (gas engine generator), a photovoltaic generator, an aerogenerator and the like.

The "load" includes a factory load, an office load, a hospital load, a commercial facility load, a home load and the like.

The "system" includes a developed country system, a developing country system, a remote island system and the like.

The "model layer" is a layer for categorizing mathematical models which more generally represent the specifications of the various electric power devices (hardware) monitored and controlled by EMSs.

Specifically, in the model layer of the sEMSA, the mathematical models corresponding to the "power storage" in the equipment layer are classified into a "circulation type" and a "non-circulation type".

Since the RF battery is a circulation type storage battery in which a liquid active material flows, the RF battery is modeled as the "circulation type" in the model layer. Other batteries, namely, the lithium-ion battery, the lead-acid battery, the molten salt battery, and the NAS battery are modeled as the "non-circulation type" in the model layer.

The mathematical models in the model layer corresponding to the "power generation" in the equipment layer are classified into a "fuel generator" and a "renewable energy generator".

Since the DG and the GE require fuel to generate power, the DG and the GE are classified into the "fuel generator" (also referred to as a "fossil-fuel generator") in the model layer. Since the photovoltaic generator and the aerogenerator do not require fuel to generate power, the photovoltaic generators and the aerogenerator are classified into the "renewable energy generator" in the model layer.

The mathematical models in the model layer corresponding to the "load" in the equipment layer are classified into a "factory", a "building", and a "home".

The factory load is classified into the "factory" in the model layer. The office load, the hospital load and the commercial facility load are classified into the "building" in the model layer. The home load is classified into the "home" in the model layer.

Specifically, the load included in the "home" in the equipment layer is a load that receives a low voltage being 200 V or lower, and the loads included in the "building" and the "factory" in the model layer are loads that receive a high voltage being greater than 200 V.

Further, the load included in the "building" is a load classified into an "office building" in an electricity charge contract, and the load included in the "factory" is a load classified into an "industrial building" in an electricity charge contract.

The mathematical models in the model layer corresponding to the "system" in the equipment layer are classified into an "interconnected system" and a "remote island".

Since power can be bought from the system in the developed country and the developing country, the developed country and the developing country are classified into the "interconnected system", and the remote island where power cannot be bought from the system is classified into the "remote island".

The "operation layer" is a layer for categorizing control programs of EMSs required to realize desired services (the services included in the "service layer" in FIG. 1).

Specifically, in the operation layer of the sEMSA, control programs that can be adopted for various EMSs are classified into control programs such as "power visualization" (also referred to as "power monitoring"), "power generation estimation", "demand estimation", "mathematical programming" (also referred to as "demand and supply plan"), and "instrumentation control".

The "power visualization" (power monitoring) refers to a control program that visualizes the power consumption amount and the power supply amount in a management-target power grid by displaying them on a display apparatus such as a liquid crystal display, so that the user can monitor them.

The "power generation estimation" refers to a control program for estimating the power generation amount of any generator included in the management-target power grid.

The "demand estimation" refers to a control program for estimating the power consumption amount of any load included in the management-target power grid.

The "mathematical programming" (demand and supply planning) refers to a control program for creating a plan for achieving a balance between the power demand amount and the power supply amount in the management-target power grid, for example for pursuing the economic efficiency, while securing the reliability of the power supply.

The "instrumentation control" refers to a control program for causing the electric power devices included in the management-target power grid to operate by automatic control such as feedback control or feedforward control, based on the sensing results of the electric power devices.

The "service layer" is a layer for categorizing the types of services (purposes) that can be realized by the EMSs.

Specifically, in the service layer of the sEMSA, the services that can be realized by various EMSs are classified into "power cost minimization", "BCP", "demand-supply balance adjustment", "power quality maintenance", and "$CO_2$ emission reduction".

The "power cost minimization" refers to a service of minimizing the power cost of the management-target power grid.

The "BCP" (Business Continuity Planning) refers to a service of maintaining the power supply in the management-target power grid even upon emergency such as natural disasters and outage.

The "demand-supply balance adjustment" refers to a service of achieving the balance between power demand and supply in the management-target power grid.

The "power quality maintenance" refers to a service of maintaining the power quality, such as preventing the voltage values and frequencies in the management-target power grid from deviating from a prescribed range.

"$CO_2$ emission reduction" refers to a service of reducing the amount of $CO_2$ emissions in the management-target power grid.

The "business layer" is a layer for categorizing the types of business (economical merits) that the user desires to realize with EMS.

Specifically, in the business layer of the sEMSA, the business that can be realized with various EMSs is classified into "energy conservation consulting", "electricity market trading", "remote island-oriented power", and "$CO_2$ emission rights".

The "energy conservation consulting" refers to consulting business relating to energy conservation in the management-target power grid.

The "electricity market trading" refers to business of trading power in the management-target power grid.

The "remote island-oriented power" refers to business of developing an EMS suitable for remote islands for the user of the management-target power grid in a remote island region.

The "$CO_2$ emission rights" refers to business of buying and selling $CO_2$ emission rights in the management-target power grid.

In the sEMSA shown in FIG. 1, the "network interface" interposed between the equipment layer and the model layer is an interface that defines the physical connection method for connecting between physical electric power devices and the software of an EMS, the communications standards used with the EMS server and the like.

For example, the ECHONET-Lite (ECHONET is a registered trademark) specifically established in Japan as the communications protocol of HEMSs corresponds to the network interface. Further, the SEP2.0 (Smart Energy Profile 2.0) being the European and American communications protocol relating to HEMSs also corresponds to the network interface.

Further, other communications standards corresponding to the network interface include a LAN being a combination of the Ethernet (registered trademark) and the TCP/IP protocol, the ZigBee (registered trademark), and the RF4CE for HEMS-related consumer electronics-use remote controller.

Still further, other communications standards corresponding to the network interface include the IEEE802.15.4 standard, which is an international standard for carrying out wireless communications with sensors and actuators in HEMSs, BEMSs, FEMSs, and CEMS.

In the sEMSA shown in FIG. 1, the "model interface" interposed between the model layer and the operation layer is an interface for performing various kinds of operations and control based on information relating to physical electric power devices, and for issuing control instructions to the electric power devices.

As will be described later, the model interface of the present embodiment employs data in which commonality of the description scheme is attained irrespective of the types in the operation layer and those in the model layer. For example, text data in which "items" and "values" corresponding thereto are described next to each other is employed.

In the sEMSA shown in FIG. 1, the "service program interface" interposed between the operation layer and the service layer is an interface that defines the correspondence between demanded service and control realizing the service.

A specific example of this interface may be, for example, a GUI screen (not shown) that presents, to the user by graphs or tables, the results of services included in the higher-level service layer achieved by execution of control programs included in the lower-level operation layer.

In the sEMSA shown in FIG. 1, the "business definition interface" interposed between the service layer and the business layer is an interface that defines the correspondence between business and service required for realizing the business.

A specific example of this interface may be, for example, a specification or a correspondence table that previously describes the correspondence between the types of business included in the higher-level business layer and the types of services included in the lower-level service layer corresponding thereto.

[Exemplary Structures of Expected EMSs]

FIG. 2 is an explanatory diagram showing exemplary structures of EMSs that can be developed with the sEMSA.

As shown in FIG. 2, in the present embodiment, it is envisaged that an EMS developer develops different types of EMSs such as a HEMS, a BEMS, a FEMS and a CEMS.

The solid line in FIG. 2 represents a "power line" (a power grid) to which the electric power devices are connected. The broken line in FIG. 2 represents a "communication channel" between the EMS server and the electric power devices. The same holds true for other drawings.

The power line is formed by, for example, a direct current power distribution line, and the electric power devices including the system are connected to the power line each via a not-shown converter (e.g., an AC/DC or a DC/DC converter).

Further, though the communication channel may be wired or wireless, the communications scheme that is based on the physical connection method and communications protocol defined in the above-described network interface is employed.

[Technical Effects of sEMSA]

Meanwhile, normally the various EMSs shown in FIG. 2 are different from each other in the number or types of the electric power devices depending on the case. Accordingly, an identical EMS cannot be used for a different management target.

For example: 1) taking solely the types of power equipment that can be a management target in each of various cases, the number of types is almost countless; and 2) the service content (an energy cost reduction, an operation independently of the system, a $CO_2$ emission reduction and the like) demanded of an EMS varies depending on the customer, and hence it is necessary to develop an algorithm that meets the purpose of the customer.

Conventionally, an EMS is developed in a customized manner for each management target while taking into account of both the above-noted conditions 1) and 2). Therefore, different software must be developed for each case.

In contrast, when a system is developed based on the sEMSA shown in FIG. 1, particularly the functions of control programs that can be used for EMSs are categorized in the higher-level operation layer, and the equipment models common to EMSs are categorized in the lower-level model layer. Therefore, the already developed software can be used for the next and following cases, and the efficiency in developing the second and following system can be improved.

For example, it is assumed that the development requirements of the operation layer and the model layer of a HEMS precedently developed are as follows:

The "operation layer"=the power visualization, the power generation estimation, the mathematical programming, and the instrumentation control The "model layer"=the circulation type storage battery, the renewable energy, the home load, and the remote island model Next, it is assumed that the development requirements of the operation layer and the model layer of a BEMS subsequently developed are as follows:

The "operation layer"=the power visualization, the power generation estimation, the mathematical programming, and the instrumentation control The "model layer"=the circulation type storage battery, the fuel generator, the renewable energy, the building demand model, and the interconnected system model In view of the foregoing assumptions, provided that development based on the sEMSA is not carried out, the system development of the subsequent BEMS is carried out independently of the system development of the preceding HEMS. Accordingly, all the control programs and equipment models necessary for the subsequent BEMS must be newly developed.

In contrast, when the development is carried out based on the sEMSA, the software of the operation layer and the model layer having already been developed in connection with the preceding HEMS can be used for the subsequent BEMS. Thus, in developing the BEMS, it is not necessary to newly develop the programs of the operation layer, and development of the fuel generator model, the building demand model, and the interconnected system model in the model layer will suffice.

In this manner, by continuing the EMS development according to the sEMSA shown in FIG. 1, the already developed software can be used for the next and following cases, whereby the efficiency in developing the second and following system can be improved.

[Correspondence Between sEMSA and Examples 1 and 2]

The inventor of the present invention has carried out system development of "Example 1" relating to a "HEMS" based on the sEMSA, and thereafter carried out system development of "Example 2" relating to "FEMS". Hereinafter, the contents of Examples 1 and 2 will be detailed, and usefulness of the sEMSA shown in FIG. 1 will be further described.

FIG. 3 is a table showing the correspondence between the sEMSA and Examples 1 and 2 in terms of the business layer, the service layer and the equipment layer.

As shown in FIG. 3, in Example 1 being a HEMS, the classification in the business layer is the "remote island-oriented power", and the classification in the service layer is the "BCP response" and the "demand-supply balance adjustment".

In Example 1 being a HEMS, the power storage classification in the equipment layer is the "RF battery"; the power generation type is the "PV" (specifically, three types including SiPV (silicon-based PV), CPV (concentrator PV) and CIGSPV (compound-based PV)) and the "aerogenerator"; the load type is the "home"; and the system type is the "remote island" (self-contained).

As shown in FIG. 3, in Example 2 being a FEMS, the classification in the business layer is the "energy conservation consulting", the "electricity market trading", and the "$CO_2$ emission rights", and the classification in the service layer is the "power cost minimization", the "BCP response", the "demand-supply balance adjustment", and the "$CO_2$ emission reduction".

In Example 2 being a FEMS, the power storage classification in the equipment layer is the "lithium-ion battery"; the power generation type is the "PV" (specifically, SiPV (silicon-based PV)) and the "GE"; the load type is "factory"; and the system type is the "developed country" (interconnected system).

[Details of Example 1 being HEMS]

Figure 4:
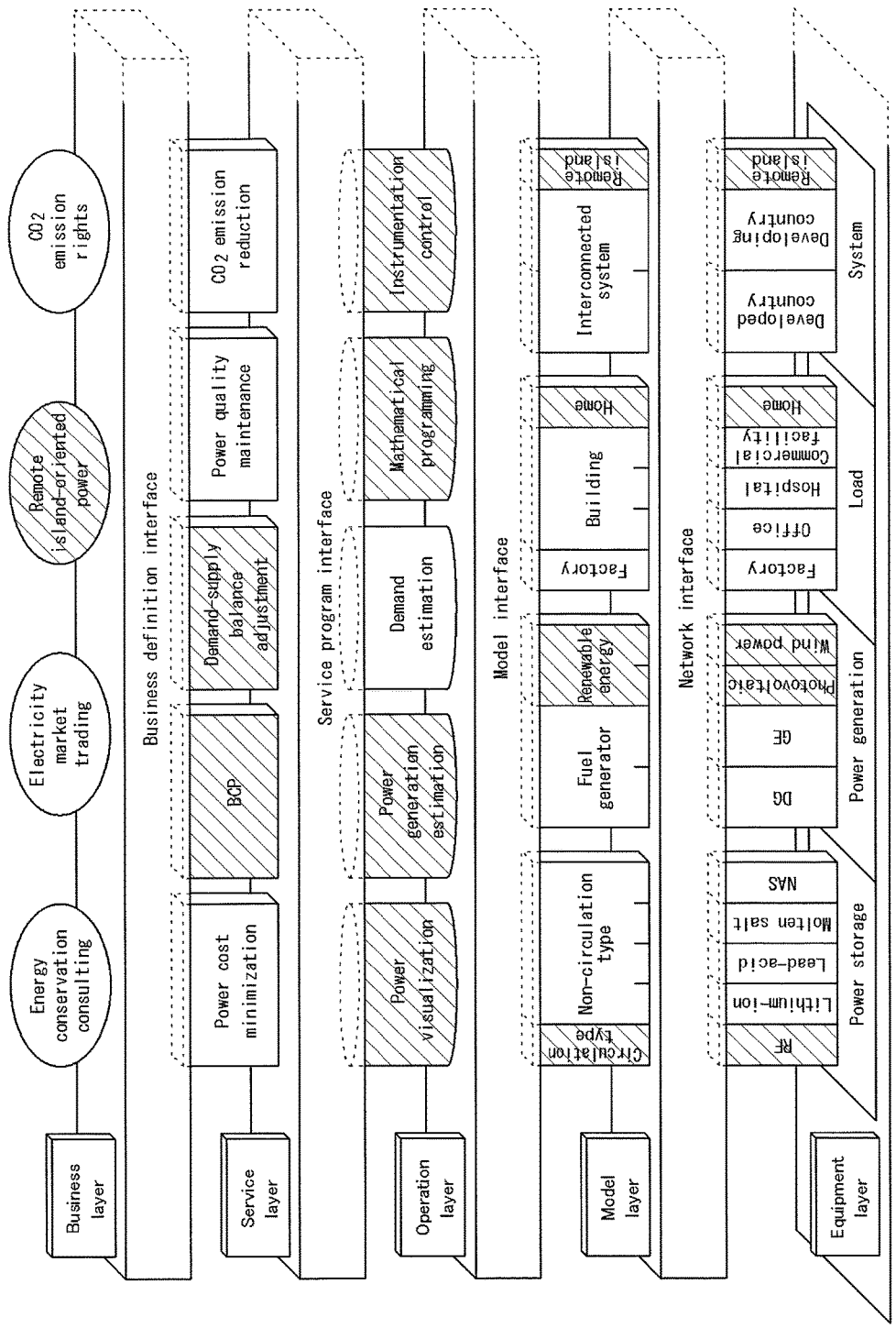
FIG. 4 is an explanatory diagram showing the correspondence between Example 1 and the sEMSA in terms of all the layers.

FIG. 4 is an explanatory diagram showing the correspondence between Example 1 and the sEMSA in terms of all the layers. FIG. 5 is an equipment structure diagram of Example 1 relating to a HEMS.

In FIG. 4, the types in the layers in Example 1 being a HEMS that should be considered with reference to the sEMSA shown in FIG. 1 are hatched. That is, Example 1 is a HEMS that is developed taking into consideration of the functions hatched in FIG. 4.

As shown in FIG. 5, in Example 1, as the management target of an EMS server 1, the "RF battery", the "SiPV", the "CPV", the "CIGSPV", the "aerogenerator" and the "home load" are connected to the power line.

The EMS server 1 can communicate with the electric power devices in accordance with a prescribed communications standard such as a LAN defined by the network interface.

Figure 6:
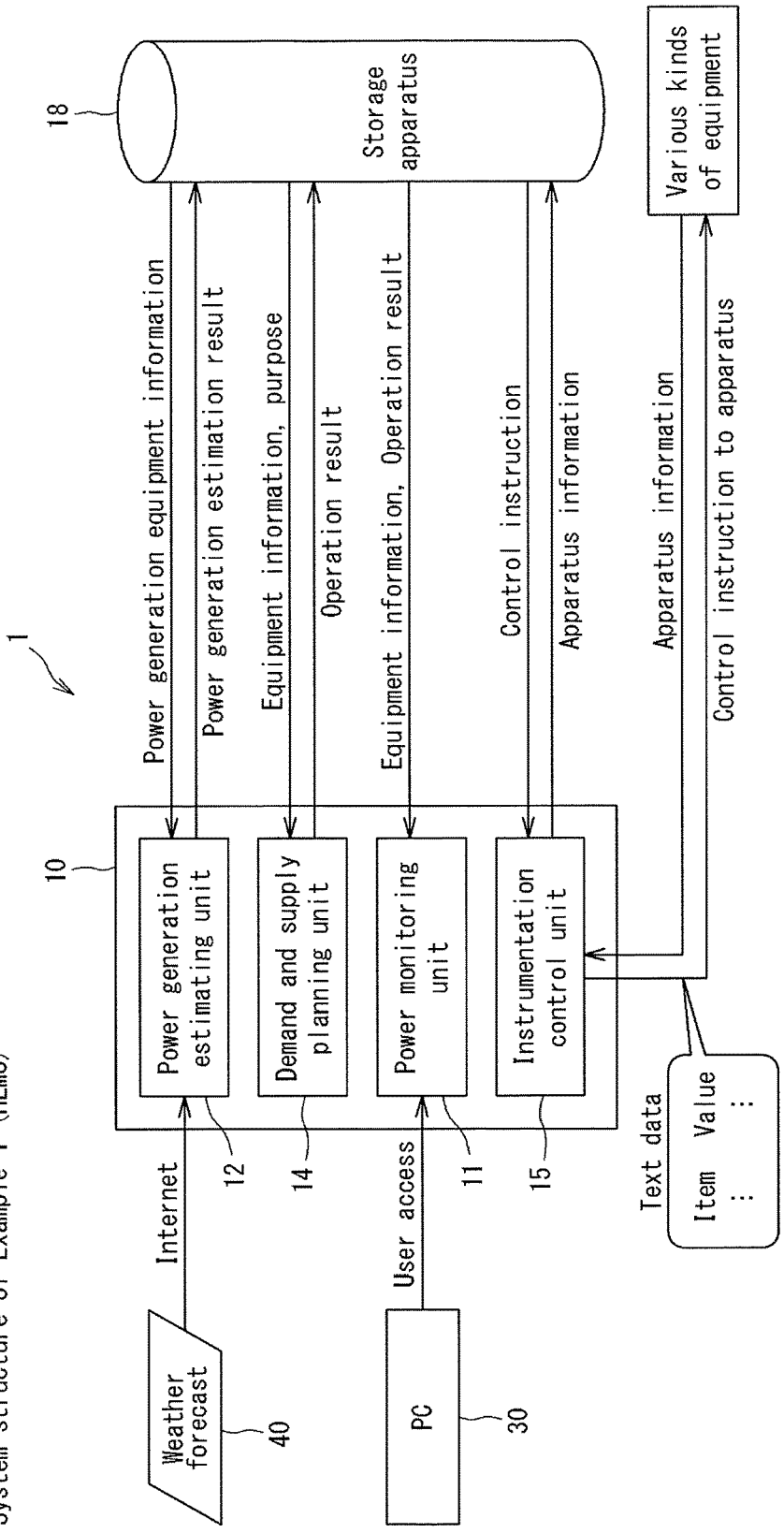
FIG. 6 is a system structure diagram of an EMS server of Example 1.

FIG. 6 is a system structure diagram of the EMS server 1 of Example 1.

As shown in FIG. 6, the EMS server 1 of Example 1 is structured by a computer apparatus that includes an operating apparatus 10 formed by a CPU (Central Processing Unit) and the like, and a storage apparatus 18 including an HDD (Hard Disk Drive) and memory such as RAM (Random Access Memory).

Note that, while not shown in FIG. 6, the EMS server 1 also includes an input apparatus including a mouse and a keyboard, and a communication apparatus that is capable of communicating with various electric devices through a wired LAN, a wireless LAN, or any other communication means.

The operating apparatus 10 of the EMS server 1 includes, as the functional units that are realized by various control programs, which are stored in the storage apparatus 18, being read and executed, a power monitoring unit 11, a power generation estimating unit 12, a demand and supply planning unit 14, and an instrumentation control unit 15.

The functional units 11, 12, 14, and 15 of the operating apparatus 10 correspond to the functions categorized in the "operation layer" of the sEMSA. That is, the power monitoring unit 11, the power generation estimating unit 12, the demand and supply planning unit 14, and the instrumentation control unit 15 respectively correspond to the functions of "power visualization", "power generation estimation", "mathematical programming", and "instrumentation control" in the operation layer of the sEMSA.

The power monitoring unit 11 starts processing as being triggered by access of the user to a terminal apparatus 30 such as a personal computer, and reads, from the storage apparatus 18, the operation results at the current time point generated by other functional units 12, 14, and 15 and equipment information.

Further, the power monitoring unit 11 displays the read information on a not-shown display apparatus such as a liquid crystal display connected to the EMS server 1, or outputs the read information to the user's terminal apparatus 30.

The power generation estimating unit 12 acquires weather forecast information 40 from a public communications network such as the Internet, and acquires equipment information of the generators being the management target (in Example 1, the rated output values of the renewable energy generators shown in FIG. 7) from the storage apparatus 18.

Further, the power generation estimating unit 12 calculates, using the acquired forecast information 40 and equipment information, a power generation amount for each of the generators being the management target and the total sum thereof, and stores the operation result in the storage apparatus 18.

The demand and supply planning unit 14 acquires, from the storage apparatus 18, the equipment information of all the electric power devices being the management target and a predetermined plan purpose. The plan purpose set in the demand and supply planning unit 14 includes a purpose defined in the service layer of the sEMSA (FIG. 4), such as the power cost minimization and the BCP response.

Further, the demand and supply planning unit 14 calculates, using the acquired equipment information and the plan purpose, a period during which the generators and loads connected to the power grid are operated and ON/OFF timing thereof, and stores the operation result in the storage apparatus 18.

The instrumentation control unit 15 acquires, from various kinds of equipment including the electric power devices and the system, information of the apparatuses (state information), and stores the acquired information of the apparatuses in the storage apparatus 18.

Further, the instrumentation control unit 15 reads a control instruction at the current time point from the storage apparatus 18, and outputs the read control instruction to a corresponding apparatus.

As shown in FIG. 6, the information exchanged between the operating apparatus 10 and the storage apparatus 18 and various kinds of equipment is formed by text data unified as the model interface, in which a blank character is inserted between an "item" and a "value" corresponding thereto.

That is, the operating apparatus 10 exchanges, between the storage apparatus 18 and various kinds of equipment, data in a common description format such as the above-described text data, irrespective of the type of functional units such as the power monitoring unit 11 and the power generation estimating unit 12.

For example, in connection with transmission of information relating to an RF battery, the text data in Example 1 is made of data such as "equipment classification RF battery", "state discharge", and "discharging power 4 kW".

Further, in connection with transmission of information relating to an SiPV, the text data is made of data such as "equipment classification SiPV" and "state ON".

FIG. 7 is an explanatory diagram of setting values of static parameters and a relational expression that define the mathematical model of the model layer in Example 1 being a HEMS.

As shown in FIG. 7, in Example 1, as the static parameters that define the mathematical model of a circulation type storage battery (RF battery), five types of parameters, namely, "storage battery capacity", "dischargeable power", "chargeable power", "discharge efficiency", and "charge efficiency" are selected. The setting values of these parameters are stored in the storage apparatus 18.

Here, the "storage battery capacity" refers to the energy capacity (Wh) of the storage battery that can be delivered from the fully charged state.

The "dischargeable power" refers to the limit value (W) of power that the storage battery can discharge.

The "chargeable power" refers to the limit value (W) of power that the storage battery can be charged.

The "discharge efficiency" refers to the proportion (%) of output power relative to the stored power when the storage battery discharges.

The "charge efficiency" refers to the proportion (%) of the stored power relative to input power when the storage battery is charged.

Further, in Example 1, as the static parameter that defines the mathematical model of six home electronic appliance loads, the "rated power consumption" of each of the home electronic appliance loads is selected. The setting values of the rated power consumption are stored in the storage apparatus 18.

Note that, the reason why the static parameter of the home loads is the rated power consumption is as follows. That is, since it is relatively easy to monitor and control individual load apparatuses, employing the rated power consumption as the static parameter enables various kinds of control to be properly exerted.

Further, in Example 1, as the static parameter that defines the mathematical model of four types of renewable energy generators, the "rated output" of the generators is selected. The setting values of the rated power are stored in the storage apparatus 18.

Note that, the reason why just the rated output will suffice for the static parameter of the renewable energy generator is as follows. That is, since the output is determined by the weather on a moment-by-moment basis with the renewable energy generators, employing solely the maximum power generation amount at the time point determined by the rated output as the static parameter is sufficient for various kinds of control to be exerted similarly to the case where other static parameters are also employed.

Further, in Example 1, as the mathematical model representing the self-contained remote island model, the following relational expression is stored in the storage apparatus 18.

power generation amount−power consumption amount+power discharge amount−power charge amount≅0

Accordingly, in Example 1, the demand and supply planning unit 14 can perform operation of controlling the electric power devices connected to the power grid, such that the above-noted relational expression is satisfied in every time slot in the management-target power grid. Note that, "≅0" (nearly 0) in the above-noted relational expression means that the left-hand side may be exactly 0, or may be equal to or smaller than a prescribed local minimum E.

Figure 8:
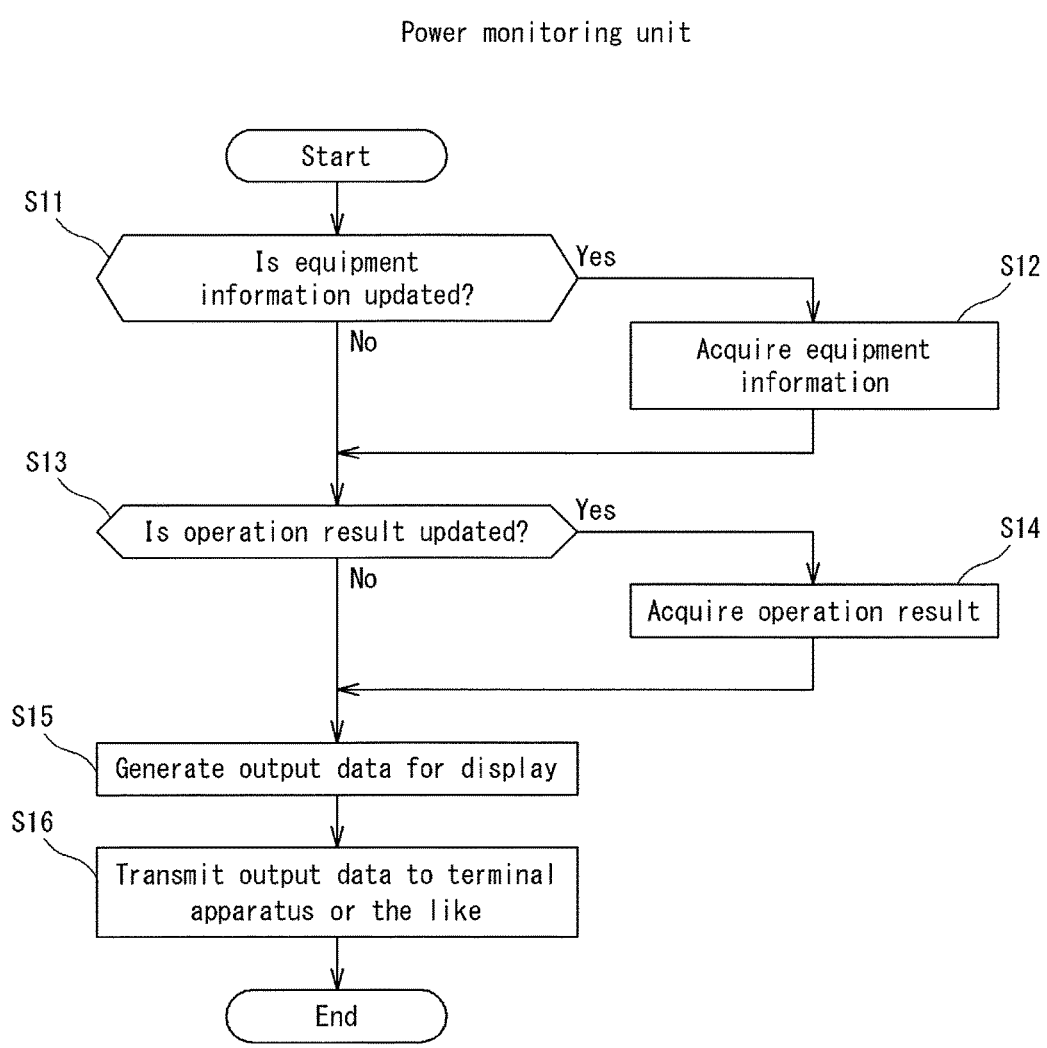
FIG. 8 is a flowchart of a control content that a power monitoring unit executes.

FIG. 8 is a flowchart of a control content that the power monitoring unit 11 executes.

As shown in FIG. 8, the power monitoring unit 11 starts processing as being triggered by user access from the terminal apparatus 30 (see FIG. 6), and firstly determines whether or not the equipment information stored in the storage apparatus 18 is updated (Step S11).

As a result of the determination, when the equipment information is updated, the power monitoring unit 11 acquires the updated equipment information from the storage apparatus 18 (Step S12).

Further, when the equipment information is not updated or after the power monitoring unit 11 has acquired the updated equipment information, the power monitoring unit 11 further determines whether or not the operation result stored in the storage apparatus 18 is updated (Step S13).

As a result of the determination, when the operation result is updated, the power monitoring unit 11 acquires the updated operation result from the storage apparatus 18 (Step S14).

When the operation result is not updated or after the power monitoring unit 11 has acquired the updated operation result, the power monitoring unit 11 generates output data for causing the operation result held at the current time point to be displayed on the display apparatus (Step S15).

Then, the power monitoring unit 11 outputs the generated output data to the display apparatus of the EMS server 1 or to the terminal apparatus 30 (Step S16), thereby visually presenting the power demand and supply at the current time point to the user.

Figure 9:
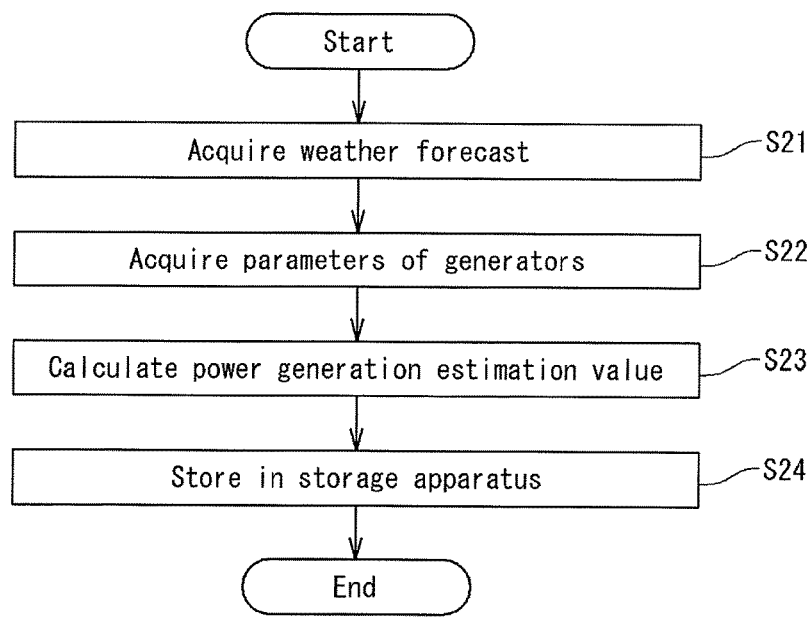
FIG. 9 is a flowchart of a control content that a power generation estimating unit executes.

FIG. 9 is a flowchart of a control content that the power generation estimating unit 12 executes.

As shown in FIG. 9, the power generation estimating unit 12 acquires the weather forecast information 40 (see FIG. 6) from a public communications network such as the Internet (Step S21), and thereafter acquires the setting values of the static parameters of the generators connected to the management-target power grid, specifically, the rated output value of three types of photovoltaic generators and the rated output value of the aerogenerator shown in FIG. 7 from the storage apparatus 18 (Step S22).

Thereafter, the power generation estimating unit 12 calculates the power generation amount for each generator and the total sum thereof using the acquired forecast information 40 and the rated output values, and stores the operation result in the storage apparatus 18 (Step S24).

Figure 10:
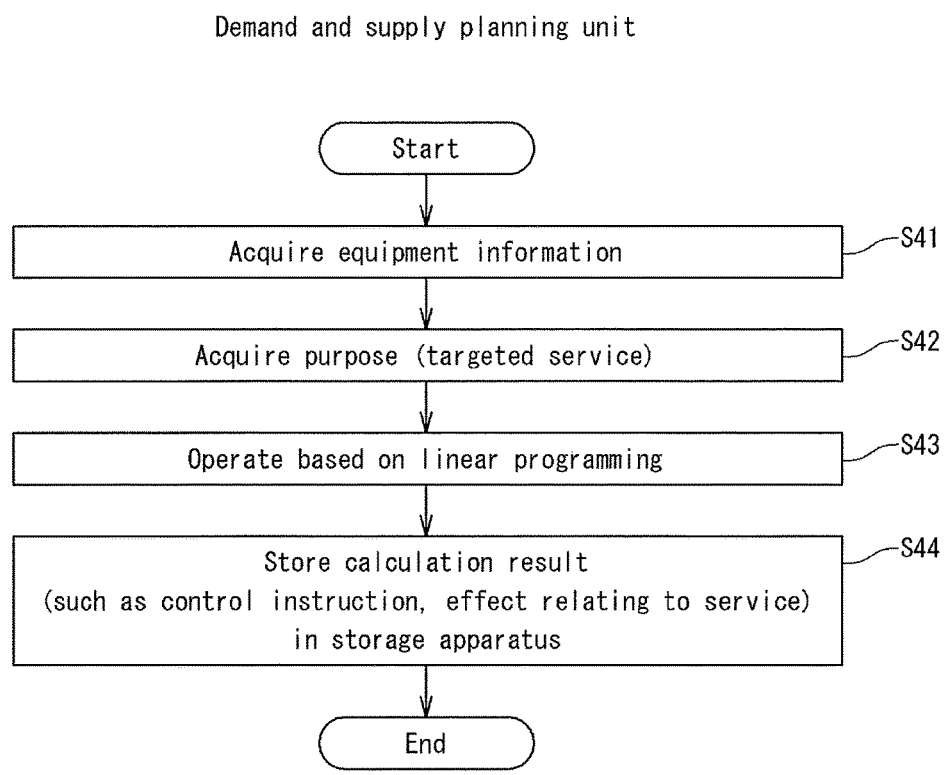
FIG. 10 is a flowchart of a control content that a demand and supply planning unit executes.

FIG. 10 is a flowchart of a control content that the demand and supply planning unit 14 executes.

As shown in FIG. 10, the demand and supply planning unit 14 acquires equipment information at the current time point (for example, the static parameters of the equipment shown in FIG. 7 and the current state (the remaining charge amount or the equipment state (drive, stop and the like))) from the storage apparatus 18 (Step S41), and acquires the plan purpose from the storage apparatus 18 (Step S42).

In Example 1, since the types of services selected in the service layer are the "BCP response" and the "demand-supply balance adjustment" (see FIG. 4), the above-noted plan purpose is stored in the storage apparatus 18 as the constraint expression that matches with the services.

The demand and supply planning unit 14 performs an optimization operation based on, for example, linear programming using the acquired equipment information and the plan purpose (Step S43), and stores the operation result as a control instruction in the storage apparatus 18 (Step S44).

Figure 11:
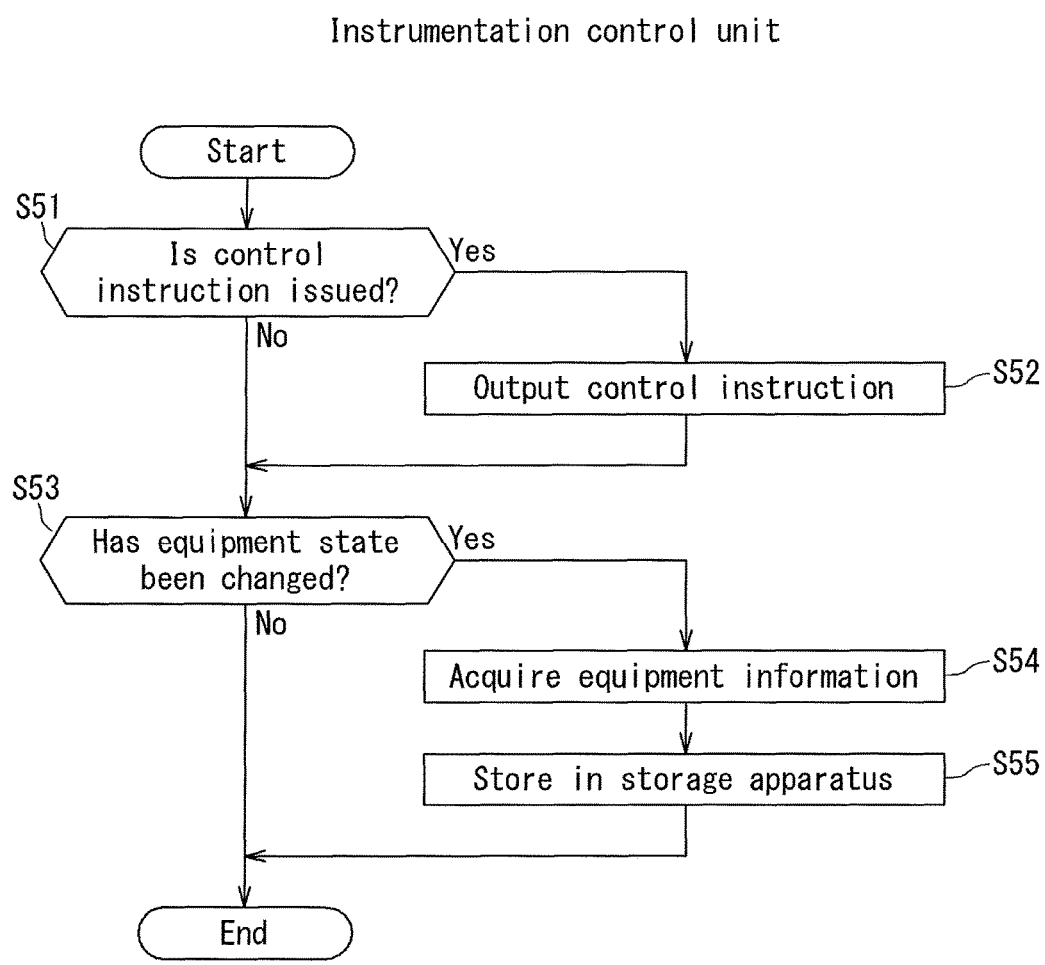
FIG. 11 is a flowchart of a control content that an instrumentation control unit executes.

FIG. 11 is a flowchart of a control content that the instrumentation control unit 15 executes.

As shown in FIG. 11, the instrumentation control unit 15 firstly determines whether or not the control instruction is stored in the storage apparatus 18 (Step S51).

As a result of the determination, when the control instruction is stored, the instrumentation control unit 15 outputs the control instruction acquired from the storage apparatus 18 to a corresponding electric power device (Step S52).

Further, when the control instruction is not stored or after the instrumentation control unit 15 has output the control instruction, the instrumentation control unit 15 determines whether or not the equipment state in the power grid (for example, the current value/voltage value of the electric power devices or power supplied from the system).

As a result of the determination, when there is any change in the equipment state, the instrumentation control unit 15 acquires, from the electric power devices, the equipment information being the sensing result of the electric power devices at the current time point (Step S54), and stores the equipment information in the storage apparatus 18 (Step S55).

[Details of Example 2 being FEMS]

Figure 12:
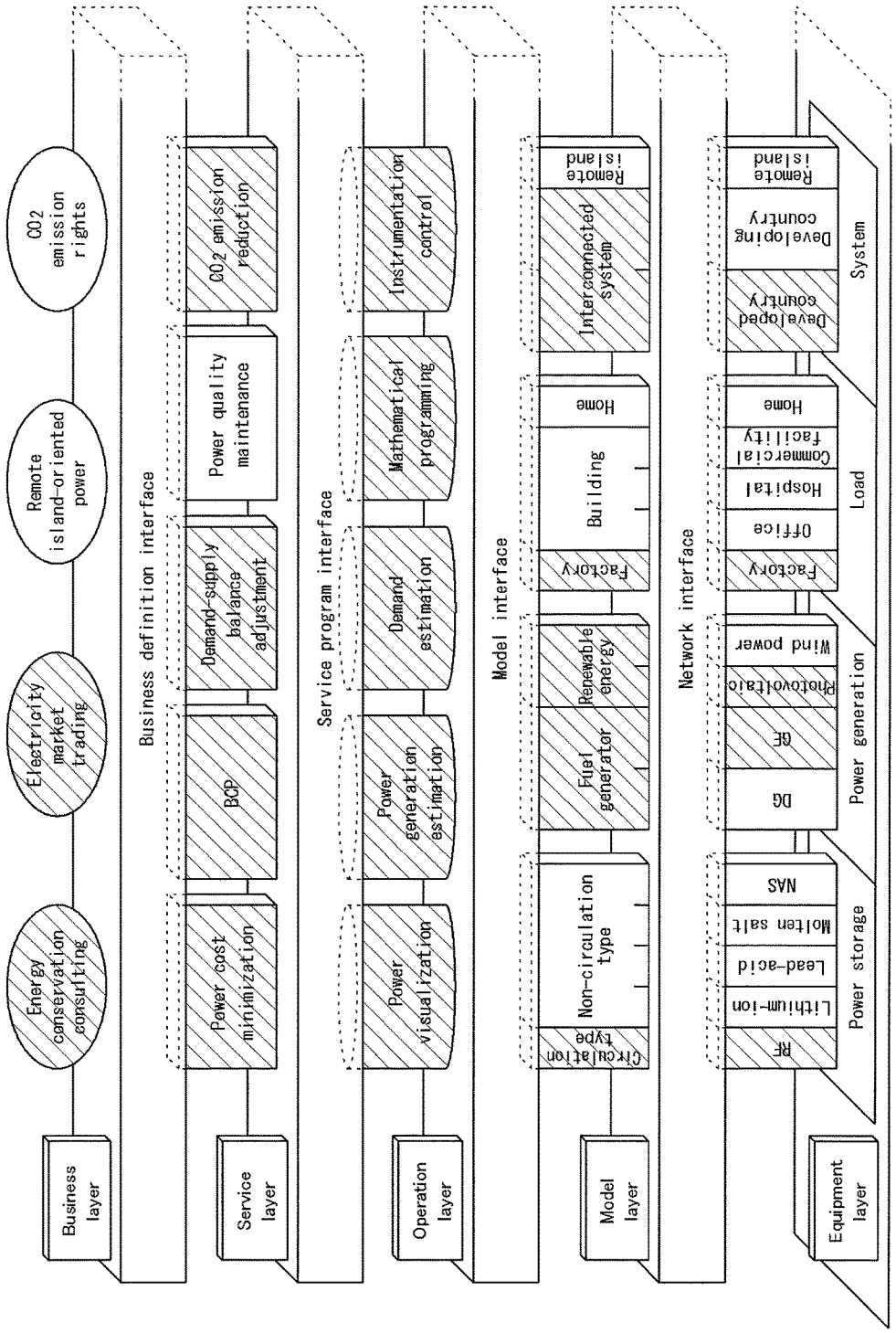
FIG. 12 is an explanatory diagram showing the correspondence between Example 2 and the sEMSA in terms of all the layers.

FIG. 12 is an explanatory diagram showing the correspondence between Example 2 and the sEMSA in terms of all the layers. FIG. 13 is an equipment structure diagram of Example 2 relating to a FEMS.

In FIG. 12, the types in the layers in Example 2 being a FEMS that should be considered with reference to the sEMSA shown in FIG. 1 are hatched. That is, Example 2 is a FEMS that is developed taking into consideration of the functions hatched in FIG. 12.

As shown in FIG. 13, in Example 2, as the management target of an EMS server 2, the "lithium-ion battery", the "PV", the "GE", the "factory load" and the "developed country system" are connected. Note that, the developed country system is classified into the "interconnected system" in the model layer, and is an interconnected system with which power can be bought.

The EMS server 2 can communicate with the electric power devices in accordance with a prescribed communications standard such as a LAN defined by the network interface.

Figure 14:
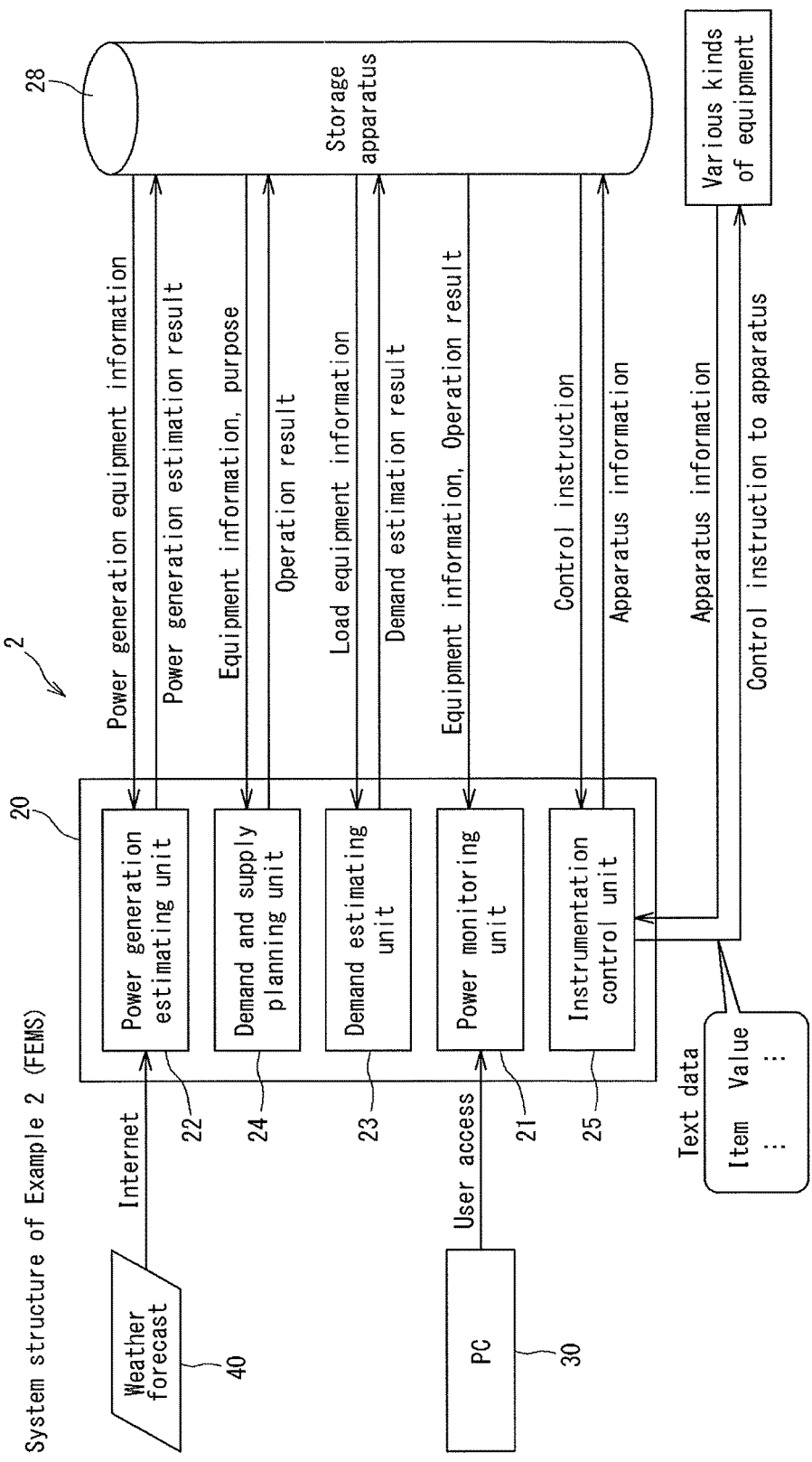
FIG. 14 is a system structure diagram of an EMS server of Example 2.

FIG. 14 is a system structure diagram of the EMS server 2 of Example 2.

As shown in FIG. 14, the EMS server 2 of Example 2 is structured by a computer apparatus that includes an operating apparatus 20 formed by a CPU and the like, and a storage apparatus 28 including memory such as RAM and an HDD.

Note that, while not shown in FIG. 14, the EMS server 2 also includes an input apparatus including a mouse and a keyboard, and a communication apparatus that is capable of communicating with various electric devices through a wired LAN, a wireless LAN, or any other communication means.

The operating apparatus 20 of the EMS server 2 includes, as the functional units that are realized by various control programs, which are stored in the storage apparatus 28, being read and executed, a power monitoring unit 21, a power generation estimating unit 22, a demand estimating unit 23, a demand and supply planning unit 24, and an instrumentation control unit 25.

The functional units 21 to 25 of the operating apparatus 20 correspond to the functions categorized in the "operation layer" of the sEMSA. That is, the power monitoring unit 21, the power generation estimating unit 22, the demand estimating unit 23, the demand and supply planning unit 24, and the instrumentation control unit 25 respectively correspond to the functions of "power visualization", "power generation estimation", "demand estimation", "mathematical programming", and "instrumentation control" in the operation layer of the sEMSA.

The power monitoring unit 21 starts processing as being triggered by access of the user to a terminal apparatus 30 such as a personal computer, and reads, from the storage apparatus 28, the operation results at the current time point generated by other functional units 22 to 25 and equipment information.

Further, the power monitoring unit 21 displays the read information on a not-shown display apparatus such as a liquid crystal display connected to the EMS server 2, or outputs the read information to the user's terminal apparatus 30.

The power generation estimating unit 22 acquires weather forecast information 40 from a public communications network such as the Internet, and acquires equipment information of the generators being the management target from the storage apparatus 28.

Further, the power generation estimating unit 22 calculates, using the acquired forecast information 40 and equipment information, a power generation amount for each of the renewable energy generators being the management target and the total sum thereof, and stores the operation result in the storage apparatus 28.

The demand estimating unit 23 acquires, from the storage apparatus 28, the equipment information of the load being the management target.

Further, the demand estimating unit 23 calculates, using the acquired equipment information, a demand estimation value of power estimated to be consumed by the load being the management target, and stores the operation result in the storage apparatus 28.

The demand and supply planning unit 24 acquires, from the storage apparatus 28, the equipment information of all the electric power devices being the management target, and a predetermined plan purpose. The plan purpose set in the demand and supply planning unit 24 includes a purpose defined in the service layer of the sEMSA (FIG. 12), such as the power cost minimization, the BCP response, the adjustment of balance between demand and supply, and $CO_2$ emission reduction.

Further, the demand and supply planning unit 24 calculates, using the acquired equipment information and the plan purpose, output values of the generators and the storage battery connected to the power grid. The demand and supply planning unit 24 calculates a control instruction based on the operation result, and stores the control instruction in the storage apparatus 28.

The instrumentation control unit 25 acquires, from various kinds of equipment including the electric power devices and the system, information of the apparatuses (state information), and stores the acquired information of the apparatuses in the storage apparatus 28.

Further, the instrumentation control unit 25 reads a control instruction at the current time point from the storage apparatus 28, and outputs the read control instruction to a corresponding apparatus.

As shown in FIG. 14, information exchanged between the operating apparatus 20 and the storage apparatus 28 and various kinds of equipment also is formed by text data unified as the model interface, in which a blank character is inserted between an "item" and a "value" corresponding thereto.

That is, the operating apparatus 20 exchanges, between the storage apparatus 28 and various kinds of equipment, data in a common description format as the above-described text data, irrespective of the type of functional units such as the power monitoring unit 21 and the power generation estimating unit 22.

For example, in connection with transmission of information relating to a lithium-ion battery, the text data in Example 2 is made of data such as "equipment classification lithium-ion battery", "state discharge", and "discharging power 250 kW".

Further, in connection with transmission of information relating to a GE (fuel generator), the text data is made of data such as "equipment classification GE", "state ON", "output 600 kW".

FIG. 15 is an explanatory diagram of setting values of static parameters and the relational expression that define the mathematical model of the model layer in Example 2 being a FEMS.

As shown in FIG. 15, in Example 2, as the parameters that define the mathematical model of a non-circulation type storage battery (lithium-ion battery), five types of parameters, namely, "storage battery capacity", "dischargeable power", "chargeable power", "discharge efficiency", and "charge efficiency" are selected. The setting values of these parameters are stored in the storage apparatus 28.

Further, in Example 2, as the static parameter that defines the mathematical model of factory loads, the "power demand" of the factory is selected. The setting value of the power demand is stored in the storage apparatus 28.

The power demand is selected as the static parameter of the factory load because the number of load apparatuses included in a factory is enormous and often varies in the future. That is, it is difficult to exert various kinds of control using power consumption of individual load apparatuses as the parameter. Control can be exerted easier and more efficiently when the power demands of whole the loads is used as the parameter.

Still further, in Example 2, as the static parameter that defines the mathematical model of a GE which is a fuel generator, "rated output", "fuel consumption amount", and "output lower limit value" of the generator are selected. The setting values of these parameters are stored in the storage apparatus 28.

The reason why the static parameters of these three types defining the mathematical model of the fuel generator are selected is as follows. That is, with the fuel generator, since the range of possible output values is limited and control can be exerted within that range, as compared to the case where solely the rated output is selected as the static parameter, various kinds of control categorized in the operation layer can be properly exerted.

Still further, in Example 2, as the static parameters that define the mathematical model of the power system, "contracted power", "contract electricity charge", and "usage-based charge" are selected. The setting values of these parameters are stored in storage apparatus 28.

Accordingly, in Example 2, the demand and supply planning unit 24 can more accurately control the power grid connected to the power system. For example, the demand and supply planning unit 24 can calculate the plan for power cost minimization based on the power cost that is obtained not only using the contracted power and the contract electricity charge, but also taking into account of the usage-based charge.

Figure 16:
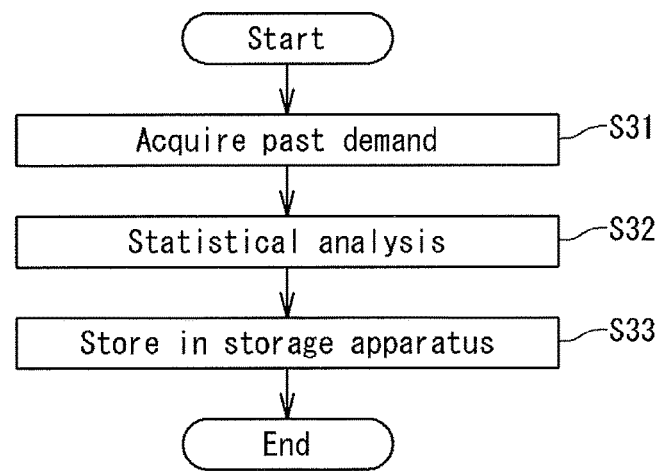
FIG. 16 is a flowchart of a control content that a demand estimating unit executes.

FIG. 16 is a flowchart of a control content that the demand estimating unit 23 executes.

As shown in FIG. 16, the demand estimating unit 23 acquires past power demand occurred in the power grid from the storage apparatus 28 (Step S31), and performs statistical estimation based on the acquired past power demand (Step S32).

Then, the demand estimating unit 23 stores the estimated operation result in the storage apparatus 28 (Step S33).

Note that, the flows of the control contents of the power monitoring unit 21, the power generation estimating unit 22, the demand and supply planning unit 24 and the instrumentation control unit 25 of the EMS server 2 (Example 2) are respectively identical to the flows of the control contents of the power monitoring unit 11 (FIG. 8), the power generation estimating unit 12 (FIG. 9), the demand and supply planning unit 14 (FIG. 10), and the instrumentation control unit 15 (FIG. 11) of the EMS server 1 (Example 1). Therefore, a detailed description thereof will not be repeated.

Effect of Present Embodiment

FIG. 17 is a table showing a comparison of development contents between Example 1 and Example 2 based on the sEMSA.

As shown in FIG. 17, though Example 1 being a HEMS and Example 2 being a FEMS are largely different from each other in the management target, they are identical in the "renewable energy" in the model layer.

Accordingly, the software relating to the renewable energy that has been developed in the preceding Example 1 can be used in the subsequent Example 2. Thus, system development can be efficiently carried out.

Further, in the operation layer, Examples 1 and 2 are identical in four control programs, namely, the "power visualization" (power monitoring), the "power generation estimation", the "mathematical programming" (demand and supply planning), and the "instrumentation control". Accordingly, the four control programs that have been developed in the preceding Example 1 can be used in the subsequent Example 2, and only the control program of the "demand estimation" should be newly developed. Thus, system development can be efficiently carried out.

Note that, the present embodiment exemplarily has showed two examples, namely Examples 1 and 2. Here, in other Example as to the third and following system development also, the system development may be carried out according to the sEMSA. Then, the software having already been developed in past Examples 1 and 2 can be used in the third and following EMS development, whereby the efficiency in the third and following system development can be improved.

Meanwhile, in the present embodiment, in modeling storage batteries, the parameters are simplified to five parameters including the storage battery capacity, the dischargeable power, the chargeable power, the discharge efficiency, and the charge efficiency, which are the static parameters that must be used in common irrespective of the types, such as the circulation type and the non-circulation type (see FIGS. 7 and 15).

This makes it possible to accurately execute one or more control programs categorized in the operation layer with a plurality of types of EMSs, such as Examples 1 and 2. Accordingly, in developing a plurality of types of EMSs, control programs of other EMS having already been developed can be used. Thus, EMSs can be efficiently developed.

Here, the reason why the five parameters are selected in modeling storage batteries is as follows.

1) Without taking into consideration of the storage battery capacity, a control instruction according to which the remaining charge amount falsely exceeds the actual storage battery capacity may be issued.

2) Without taking into consideration of the dischargeable power, a control instruction to perform discharging exceeding the dischargeable power of the storage battery may be issued.

3) Without taking into consideration of the chargeable power, a control instruction to perform charging exceeding the chargeable power of the storage batteries may be issued.

4) Without taking into consideration of the charge efficiency and the discharge efficiency, control that reflects the relationship among the actual charging, discharging and remaining charge amount may not be exerted.

Note that, the basis of 4) is further described using mathematical expressions hereinafter.

That is, when variables required to calculate the remaining charge amount at the current time point are defined as follows, the remaining charge amount at time point t+1 without taking into consideration of the charge and discharge efficiency is represented by the following Equation (1).

Bsoc(t): the remaining charge amount at time point t
Bch(t)(t): the charging power at time point t
Bdis(t): the discharging power at time point t
Lch: charge efficiency
Ldis: discharge efficiency $$Bsoc(t+1)=Bsoc(t)+Bch(t)-Bdis(t) \quad (1)$$

On the other hand, the remaining charge amount at time point t+1 taking into consideration of the charge and discharge efficiency is represented by the following Equation (2).

$$Bsoc(t+1)=Bsoc(t)+Lch \times Bch(t)-Ldis \times Bdis(t) \quad (2)$$

As can be seen clearly from a comparison between Equations (1) and (2), Equation (2) that takes into consideration of the charge and discharge efficiency more practically reflects the state of the storage battery. Thus, the accuracy of various kinds of control can be improved when the charge and discharge efficiency is taken into consideration.

[Other Variations]

The embodiment disclosed herein is illustrative in all its aspects and should not be considered to be limiting. It is intended that the scope of the present invention is shown by the scope of the claims, and includes meanings equivalent to the scope of the claims and all modifications within the scope.

For example, while the static parameters that define the mathematical model of the storage battery are five types including the "storage battery capacity", the "dischargeable power", the "chargeable power", the "discharge efficiency" and the "charge efficiency" in the embodiment described above (see FIGS. 7 and 15), the parameters may be six types further including a "self discharge rate".

Here, the "self discharge rate" refers to the rate (%) of a reduction in the storage capacity by self discharge after a lapse of prescribed time (for example, one day).

Including further the self discharge rate into the static parameters that define the mathematical model of the storage battery, various kinds of control with the control programs included in the operation layer can be exerted with a precise remaining charge amount which is almost the actual value. Accordingly, as compared to the above-described case where the static parameters of the storage battery are five, more accurate control can be exerted.

Further, in the embodiment described above, the sEMSA shown in FIG. 1 is structured by five layers. However, at least three layers from the equipment layer to the operation layer will suffice, and the business layer and the service layer can be dispensed with.

Still further, in the above-described embodiment, while the case in which a HEMS (Example 1) and a FEMS (Example 2) are developed according to the sEMSA has been exemplarily shown, it is also possible to develop other EMSs such as a BEMS and a CEMS according to the sEMSA.

REFERENCE SIGNS LIST

1: EMS SERVER
2: EMS SERVER
10: OPERATING APPARATUS
11: POWER MONITORING UNIT

12: POWER GENERATION ESTIMATING UNIT
14: DEMAND AND SUPPLY PLANNING UNIT
15: INSTRUMENTATION CONTROL UNIT
18: STORAGE APPARATUS
20: OPERATING APPARATUS
21: POWER MONITORING UNIT
22: POWER GENERATION ESTIMATING UNIT
23: DEMAND ESTIMATING UNIT
24: DEMAND AND SUPPLY PLANNING UNIT
25: INSTRUMENTATION CONTROL UNIT
28: STORAGE APPARATUS
30: TERMINAL APPARATUS
40: FORECAST INFORMATION

The invention claimed is:

1. A non-transitory computer readable storage medium storing a computer program for causing a computer to operate as an energy management system for managing an operation state of an electric power device including a storage battery connected to a power grid, the computer program comprising:
a first step of acquiring static parameters to be used in controlling the electric power device; and
a second step of controlling the electric power device based on the acquired static parameters, wherein
the static parameters acquired in the first step are commonly used irrespective of whether the storage battery is circulation type or non-circulation type, and the static parameters are at least five types of parameters including:
a storage battery capacity, being an energy capacity of the storage battery that can be delivered from a fully charged state;
dischargeable power, being a limit value of power that the storage battery can discharge;
chargeable power, being a limit value of power that the storage battery can be charged;
discharge efficiency, being a proportion of output power relative to stored power when the storage battery discharges; and
charge efficiency, being a proportion of stored power relative to input power when the storage battery is charged.

2. The storage medium according to claim 1, wherein the static parameters acquired in the first step further includes a self discharge rate, being a rate of a reduction in the storage capacity by self discharge after a lapse of prescribed time.

3. The storage medium according to claim 1, wherein the static parameters relating to the storage battery acquired in the first step are fixed to the five parameters according to claim 1 or the six parameters that include the five parameters according to claim 1 and a self discharge rate, being a rate of a reduction in the storage capacity by self discharge after a lapse of prescribed time.

4. The storage medium according to claim 1, wherein the control exerted over the electric power device in the second step is control that uses at least one result out of five types of categorized control, the five types of control including:
power monitoring, being control to visualize a demand and supply state of power in the power grid;
power generation estimation, being control to estimate a power generation amount in the power grid;
demand estimation, being control to estimate a power consumption amount in the power grid;
demand and supply planning, being control to plan power demand and supply in the power grid; and
instrumentation control, being control to cause the electric power device included in the power grid to operate in accordance with a sensing result.

5. The storage medium according to claim 1, wherein, when the power grid is not connected to a power system, the electric power device is controlled such that a relational expression is satisfied in every time slot in the power grid, the relational expression being:

power generation amount−power consumption amount+power discharge amount−power charge amount≅0

6. The storage medium according to claim 1, wherein, when the electric power device includes a renewable energy generator, the static parameters acquired in the first step include at least a maximum power generation amount determined by a rated output of the renewable energy generator.

7. The storage medium according to claim 1, wherein, when the electric power device includes a fossil-fuel generator, the static parameters acquired in the first step include at least a rated output, a fuel consumption amount, and an output lower limit value of the fossil-fuel generator.

8. The storage medium according to claim 1, wherein, when the electric power device includes a load apparatus of a home, the static parameters acquired in the first step include at least an individual rated power consumption of the load apparatus of the home.

9. The storage medium according to claim 1, wherein, when the electric power device includes a load apparatus of a factory, the static parameters acquired in the first step include at least power demand of the entire load apparatus included in the factory.

10. The storage medium according to claim 1, wherein, when the power grid is connected to the power system, the static parameters relating to the power system acquired in the first step at least include contracted power, a contract electricity charge, and a usage-based charge.

11. An energy management method for managing an operation state of an electric power device including a storage battery connected to a power grid, the method comprising:
a first step of acquiring static parameters to be used in controlling the electric power device; and
a second step of controlling the electric power device based on the acquired static parameters, wherein
the static parameters acquired in the first step are commonly used irrespective of whether the storage battery is circulation type or non-circulation type, and the static parameters are at least five types of parameters including:
a storage battery capacity, being an energy capacity of the storage battery that can be delivered from a fully charged state;
dischargeable power, being a limit value of power that the storage battery can discharge;
chargeable power, being a limit value of power that the storage battery can be charged;
discharge efficiency, being a proportion of output power relative to stored power when the storage battery discharges; and
charge efficiency, being a proportion of stored power relative to input power when the storage battery is charged.

12. An energy management system for managing an operation state of an electric power device including a storage battery connected to a power grid, the system comprising a computer apparatus in which the computer program according to claim 1 is installed.

13. An energy management system for managing an operation state of an electric power device connected to a power grid, the system comprising:
- an acquiring unit that acquires a static parameter modeled in a first layer for controlling the electric power device, the static parameter being commonly used irrespective of whether a storage battery is circulation type or non-circulation type; and
- a control unit that inputs the static parameter acquired by the acquiring unit into one or more control programs categorized in a second layer of a level higher than the first layer and executes the control program(s), to thereby control the operation state of the electric power device.

* * * * *